(12) United States Patent
Richards, III

(10) Patent No.: US 8,742,622 B2
(45) Date of Patent: Jun. 3, 2014

(54) SYSTEM AND METHOD FOR THERMAL PROTECTION IN A POWER SYSTEM

(75) Inventor: George Richards, III, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 449 days.

(21) Appl. No.: 12/905,269

(22) Filed: Oct. 15, 2010

(65) Prior Publication Data
US 2012/0091815 A1     Apr. 19, 2012

(51) Int. Cl.
| | |
|---|---|
| H02J 1/00 | (2006.01) |
| H02J 3/00 | (2006.01) |
| H02J 7/00 | (2006.01) |
| G05F 1/577 | (2006.01) |
| H03K 21/00 | (2006.01) |
| H03K 23/00 | (2006.01) |
| H03K 25/00 | (2006.01) |
| H02M 5/00 | (2006.01) |

(52) U.S. Cl.
USPC ............ 307/80; 320/136; 323/267; 327/115; 363/148

(58) Field of Classification Search
None
See application file for complete search history.

(56) References Cited

U.S. PATENT DOCUMENTS

| | | | | |
|---|---|---|---|---|
| 6,528,974 | B1 * | 3/2003 | Mirov et al. | 323/267 |
| 6,535,798 | B1 * | 3/2003 | Bhatia et al. | 700/293 |
| 7,298,601 | B2 * | 11/2007 | Covi et al. | 361/56 |
| 2008/0116852 | A1 * | 5/2008 | Kuo | 320/136 |
| 2011/0051479 | A1 * | 3/2011 | Breen et al. | 363/148 |
| 2012/0091815 | A1 * | 4/2012 | Richards, III | 307/80 |

* cited by examiner

*Primary Examiner* — Jared Fureman
*Assistant Examiner* — Aqeel Bukhari
(74) *Attorney, Agent, or Firm* — Baker Botts L.L.P.

(57) ABSTRACT

In accordance with embodiments of the present disclosure, systems and methods for thermal protection in a power system may be provided. In accordance with certain embodiments of the present disclosure, a method for thermal protection in a power system having a plurality of power modules selectively enabled and disabled in accordance with an efficiency policy may be provided. The method may include determining if an operating temperature for the power system is greater than a first threshold temperature. The method may also include enabling one or more power modules disabled in accordance with the efficiency policy in response to a determination that the operating temperature is greater than the first threshold temperature.

18 Claims, 2 Drawing Sheets

SYSTEM AND METHOD FOR THERMAL PROTECTION IN A POWER SYSTEM

TECHNICAL FIELD

The present disclosure relates in general to thermal protection in information handling systems, and more particularly to thermal protection of power systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often incorporate power systems with multiple individual power modules to ensure that information handling resources are consistently supplied with necessary electrical current. For example, an information handling system may incorporate a voltage regulator with multiple phases, each phase capable of delivering a particular amount of electrical current. As another example, an information handling system may incorporate a power supply system with multiple redundant power supplies, each redundant power supply capable of delivering a particular amount of electrical current.

Some traditional multi-phase voltage regulators utilize phase shedding, whereby such voltage regulators are configured to cease supplying electrical current from unneeded phases. Phase shedding occurs when electrical current demand decreases to a threshold level in which the multi-phase voltage regulator can disable a phase and still supply the necessary electrical current. In a manner similar to phase shedding in voltage regulators, a traditional power supply system may selectively disable or power down one or more of its redundant power supplies when electrical current decreases to a threshold level in which the power supply system can disable a redundant power supply and still supply the necessary electrical current. Such phase shedding or disabling of power supplies may be desirable in order to maximize power efficiency of a power system.

One disadvantage of disabling power modules (e.g., shedding of regulator phases or disabling of redundant power supplies) is that the current demands of the individual power modules that remain enabled may increase. In other words, a power module that remains enabled may be required to supply an electrical current greater than such power module would need to supply if all power modules were enabled. In supplying such increased demand, a power module may experience increased operating temperatures. As a result of operating at increased temperatures, a power system may experience lower than expected efficiencies, decreased reliability, or decreased lifetime. Traditional responses to exceeding a temperature threshold include forcing a shutdown of the power system, which may lead to undesired downtime or other undesired effects.

SUMMARY

In accordance with the teachings of the present disclosure, disadvantages and problems associated with protection of power systems from high-temperature conditions may be substantially reduced or eliminated.

In accordance with embodiments of the present disclosure, a power system may include a plurality of power modules, and a controller electrically coupled to the plurality of power modules. Each power module may configured to supply electrical current to one or more information handling resources electrically coupled to the power system. The controller may be configured to: selectively enable and disable power modules in accordance with an efficiency policy, determine if an operating temperature for the power system is greater than a first threshold temperature, and enable one or more power modules disabled in accordance with the efficiency policy in response to a determination that the operating temperature is greater than the first threshold temperature.

In accordance with additional embodiments of the present disclosure, a method for thermal protection in a power system having a plurality of power modules selectively enabled and disabled in accordance with an efficiency policy may be provided. The method may include determining if an operating temperature for the power system is greater than a first threshold temperature. The method may also include enabling one or more power modules disabled in accordance with the efficiency policy in response to a determination that the operating temperature is greater than the first threshold temperature.

In accordance with further embodiments of the present disclosure, an information handling system may include one or more information handling resources and a power system a power system electrically coupled to the one or more information handling resources. The power system comprising may include a plurality of power modules and a controller electrically coupled to the plurality of power modules. Each power module may be configured to supply electrical current to the one or more information handling resources. The controller may be configured to selectively enable and disable power modules in accordance with an efficiency policy, determine if an operating temperature for the power system is greater than a first threshold temperature, and enable one or more power modules disabled in accordance with the efficiency policy in response to a determination that the operating temperature is greater than the first threshold temperature.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
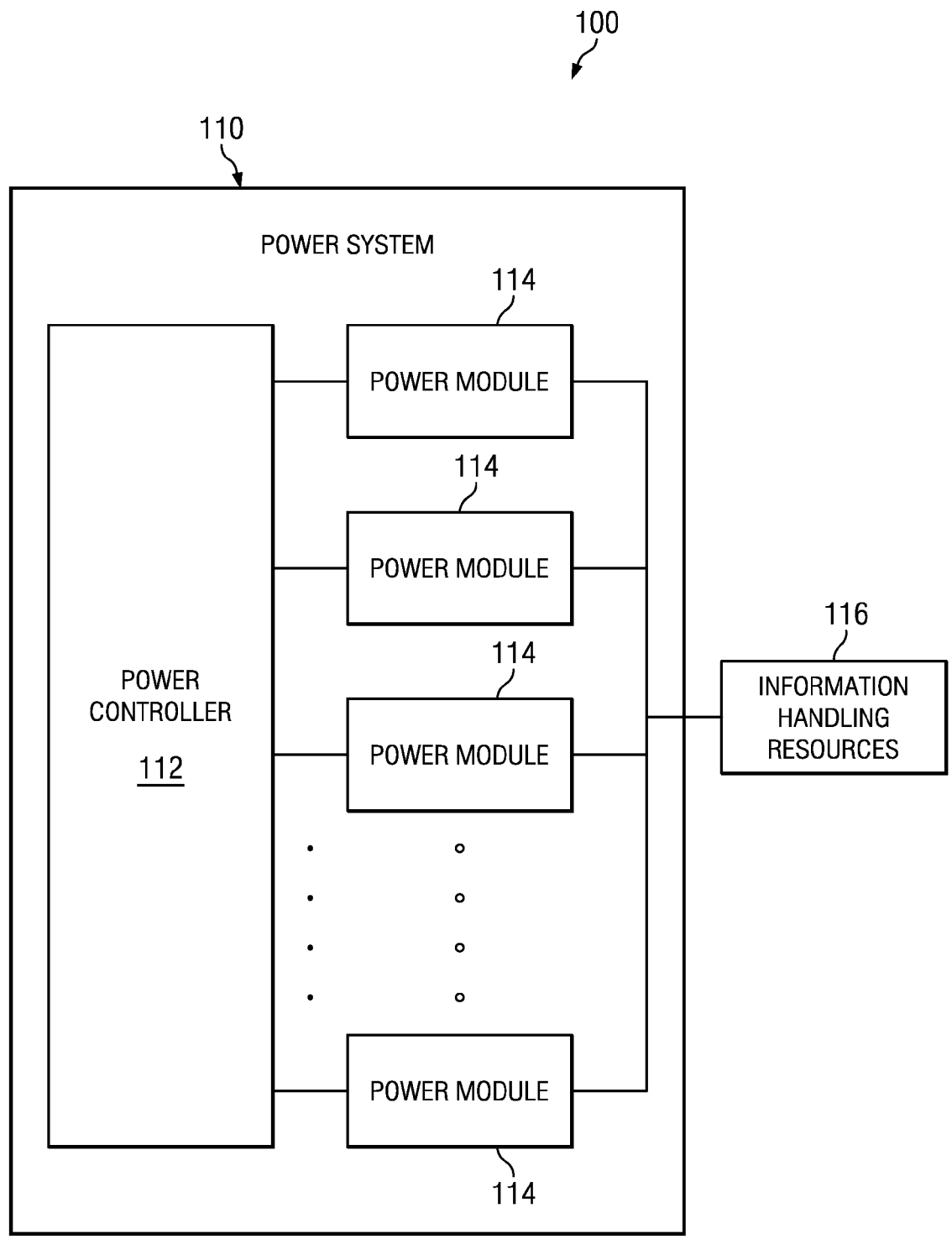
FIG. 1 illustrates a block diagram of an example of an information handling system, in accordance with embodiments of the present disclosure.
Figure 2:
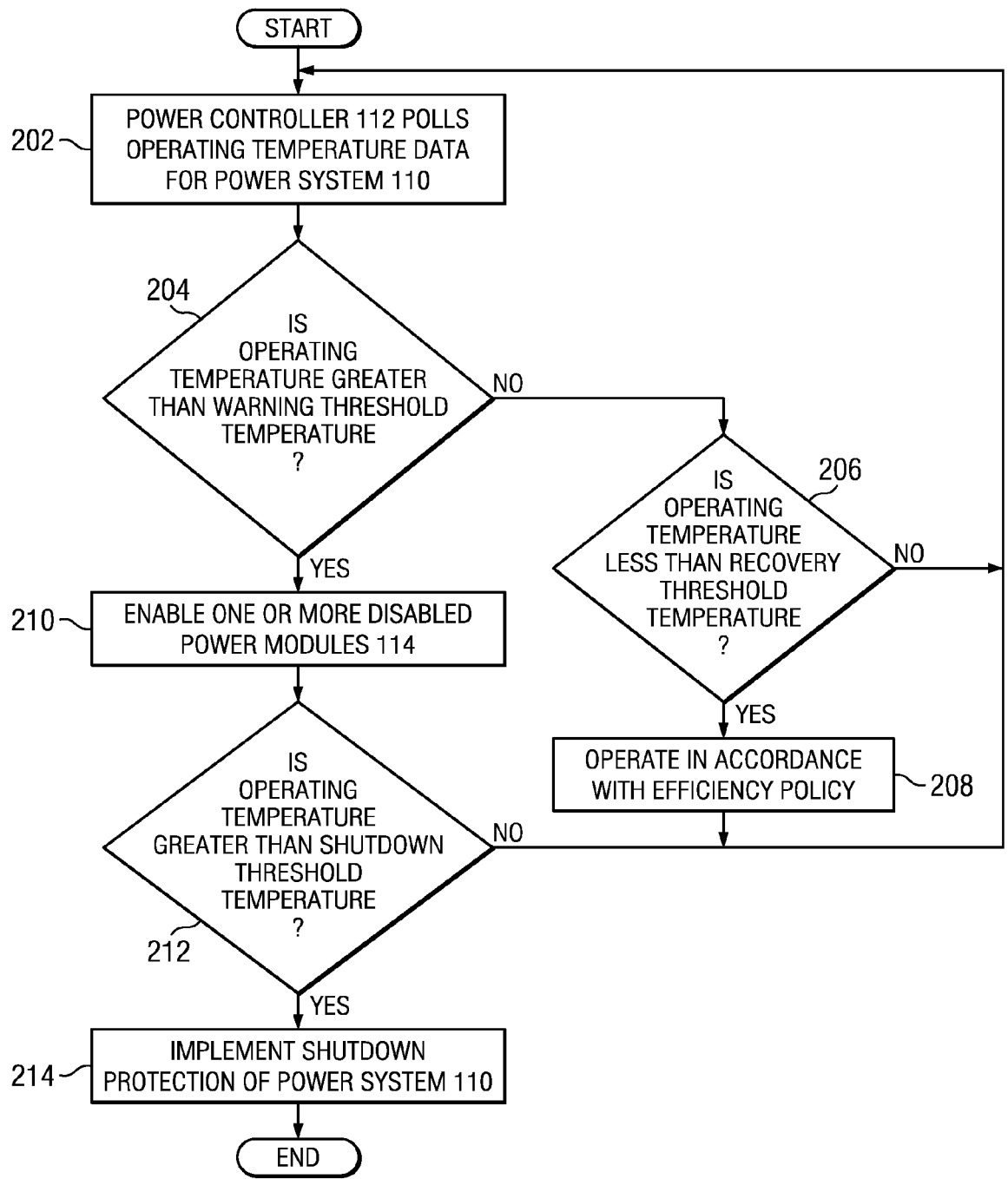
FIG. 2 illustrates a flow chart of an example method for thermal protection in a power system, in accordance with embodiments of the present disclosure.

Preferred embodiments and their advantages are best understood by reference to FIGS. 1 and 2, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage resource, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more busses operable to transmit communications between the various hardware components.

For the purposes of this disclosure, information handling resources may broadly refer to any component system, device or apparatus of an information handling system, including without limitation processors, busses, computer-readable media, input-output devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

For the purposes of this disclosure, a processor may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, a processor may interpret and/or execute program instructions and/or process data stored in memory and/or another component of an information handling system.

FIG. 1 illustrates a block diagram of an example of an information handling system 100 incorporating a power system 110 in accordance with an embodiment of the present disclosure. As depicted, information handling system 100 may include a power system 110, and one or more other information handling resources 116.

Generally speaking, power system 110 may include any system, device, or apparatus configured to supply electrical current to one or more information handling resources 116. In some embodiments, power system 110 may include a multi-phase voltage regulator. In other embodiments, power system 110 may include a collection of redundant power supply units.

Power system 110 may include a power controller 112 and a plurality of power modules 114. Power controller 112 may include any system, device, or apparatus configured to control the output of power system 110 and/or selectively enable to disable power modules 114. The enabling and disabling of power modules 114 is described in greater detail below.

Each power module 114 may include any system, device, or apparatus configured to supply a portion of the total current output of power system 110. In embodiments in which power system 110 is a multi-phase voltage regulator, a power module 114 may comprise a phase of the voltage regulator. In embodiments in which power system 110 is a redundant power supply system, a power module 114 may comprise a redundant power supply.

Generally speaking, information handling resources 116 may include any component system, device or apparatus of information handling system 100, including without limitation processors, busses, computer-readable media, input-output devices and/or interfaces, storage resources, network interfaces, motherboards, electro-mechanical devices (e.g., fans), displays, and/or power supplies.

In operation, power controller 112 may selectively enable one or more disabled power modules 114 in response to a temperature fault (e.g., operating temperature of power system 110, a power module 114, or component thereof exceeding a threshold temperature). Such selective enabling provides an alternative to the traditional approach of immediate shutdown in response to a temperature fault, by reconfiguring the number of enabled power modules 114 which may lower operating temperatures and thereby maintain operation of power system 110 and/or information handling system 100.

FIG. 2 provides an example of such selective enabling. FIG. 2 illustrates a flow chart of an example method 200 for thermal protection in power system 110, in accordance with embodiments of the present disclosure. According to one embodiment, method 200 may begin at step 202. As noted above, teachings of the present disclosure may be implemented in a variety of configurations of information handling system 100. As such, the preferred initialization point for method 200 and the order of the steps 202-214 comprising method 200 may depend on the implementation chosen.

At step 202, power controller 112 may poll operating temperature data for power system 110. Power controller 112 may receive such temperature data via any suitable manner, including without limitation receipt of such information from one or more temperature sensors located within and/or proximate to power modules 114 and/or other components of power system 110.

At step 204, power controller 112 may determine if a polled operating temperature is greater than a warning threshold temperature. An operating temperature greater than the warning threshold temperature may indicate power system 110 is in danger of experiencing a thermal fault requiring shutdown unless thermal protection measures are undertaken. If the operating temperature is greater than the warning threshold temperature, method 200 may proceed to step 210 in which power system 110 may enter a thermal protection mode, as described in greater detail below. Otherwise, if the operating temperature is not greater than the warning threshold temperature, method 200 may proceed to step 206.

At step 206, power controller 112 may determine if the operating temperature is lesser than a recovery threshold temperature. In some embodiments, the recovery threshold temperature may be lesser than the warning threshold temperature. An operating temperature lesser than the recovery threshold temperature may indicate that power system 110 may be removed from a thermal protection mode, if presently in a thermal protection mode. If the operating temperature is lesser than the recovery threshold temperature, method 200 may proceed to step 208. Otherwise, if the operating temperature is not lesser than the recovery threshold temperature, method 200 may proceed again to step 202.

At step 208, in response to a determination that the operating temperature is lesser than the recovery threshold temperature, power controller 112 may configure power modules 114 and/or other components of power system 110 to operate in accordance with its power efficiency policy (e.g., a phase shedding policy in the case of a multi-phase regulator, or a redundancy policy on the case of an array of redundant power supplies). After completion of step 208, method 200 may proceed again to step 202.

At step 210, in response to a determination that the operating temperature is greater than the warning threshold temperature, power controller 112 may enable one or more presently disabled power modules 114, effectively overriding any power efficiency policy (e.g., phase shedding policy and/or redundancy policy) in an effort to reduce the operating temperature.

At step 212, power controller 112 may determine if a polled operating temperature is greater than a shutdown threshold temperature. An operating temperature greater than the shutdown threshold temperature may indicate power system 110 is operating at a dangerously high temperature and will require shutdown in order to prevent catastrophic failure of power system 110. If the operating temperature is greater than the shutdown threshold temperature, method 200 may proceed to step 212. Otherwise, if the operating temperature is not greater than the shutdown threshold temperature, method 200 may proceed again to step 2062.

At step 214, in response to a determination that the operating temperature is greater than the shutdown threshold temperature, power controller 112 may cause power system 110 to shut down in order to protect power system 110. After completion of step 214, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order. In addition, the steps comprising method 200 may be repeated, independently and/or collectively, as often as desired or required by a chosen implementation.

Method 200 may be implemented using system 100 or any other system operable to implement method 200. In certain embodiments, method 200 may be implemented partially or fully in software and/or firmware embodied in computer-readable media.

A component of information handling system 100 may include logic. Logic may perform the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

Although the present disclosure has been described in detail, it should be understood that various changes, substitutions, and alterations can be made hereto without departing from the spirit and the scope of the disclosure as defined by the appended claims.

What is claimed is:

1. A power system comprising:
 a plurality of power modules, each power module configured to supply electrical current to one or more information handling system resources electrically coupled to the power system; and
 a controller electrically coupled to the plurality of power modules and configured to:
  selectively enable and disable power modules in accordance with an efficiency policy;
  determine if an operating temperature for the power system is greater than a first threshold temperature;
  override the efficiency policy to enable one or more power modules disabled in accordance with the efficiency policy in response to a determination that the operating temperature is greater than the first threshold temperature, the one or more power modules enabled to supply electrical current to the one or more information handling system resources;
  determine if the operating temperature is lesser than a second threshold temperature; and
  in response to a determination that the operating temperature is lesser than the second threshold temperature and in accordance with the efficiency policy, disable one or more power modules that were enabled in an override of the efficiency policy and in response to the determination that the operating temperature was greater than the first threshold temperature.

2. A power system in accordance with claim 1, wherein the second threshold temperature is less than the first threshold temperature.

3. A power system in accordance with claim 1, the controller further configured to:
 determine if the operating temperature is greater than a third threshold temperature; and
 shut down the power system in response to a determination that the operating temperature is greater than a third threshold temperature.

4. A power system in accordance with claim 3, wherein the third threshold temperature is greater than the first threshold temperature.

5. A power system in accordance with claim 1, wherein each of the plurality of power modules comprises a redundant power supply unit.

6. A power system in accordance with claim 5, wherein the efficiency policy comprises a redundancy policy for the redundant power supply units.

7. A power system in accordance with claim 1, wherein each of the plurality of power modules comprises a phase of a multi-phase regulator.

8. A power system in accordance with claim 7, wherein the efficiency policy comprises a phase shedding policy for the phases.

9. A method for thermal protection in a power system having a plurality of power modules selectively enabled and disabled in accordance with an efficiency policy, comprising:

disabling one or more power modules in accordance with the efficiency policy;

determining, in response to the disabling of the one or more power modules in accordance with the efficiency policy, that an operating temperature for the power system is greater than a first threshold temperature;

overriding the efficiency policy to enable the one or more power modules disabled in accordance with the efficiency policy in response to a determination that the operating temperature is greater than the first threshold temperature, the one or more power modules enabled to supply electrical current to one or more information handling system resources;

determining if the operating temperature is lesser than a second threshold temperature; and disabling the one or more power modules that were enabled as part of the overriding of the efficiency policy and in response to the determination that the operating temperature was greater than the first threshold temperature, in accordance with the efficiency policy and in response to a determination that the operating temperature is lesser than the second threshold temperature.

10. A method in accordance with claim 9, wherein the second threshold temperature is less than the first threshold temperature.

11. A method in accordance with claim 9, further comprising:

determining if the operating temperature is greater than a third threshold temperature; and shutting down the power system in response to a determination that the operating temperature is greater than a third threshold temperature.

12. A method in accordance with claim 11, wherein the third threshold temperature is greater than the first threshold temperature.

13. A method in accordance with claim 9, wherein each of the plurality of power modules comprises a redundant power supply unit.

14. A method in accordance with claim 13, wherein the efficiency policy comprises a redundancy policy for the redundant power supply units.

15. A method in accordance with claim 9, wherein each of the plurality of power modules comprises a phase of a multiphase regulator.

16. A method in accordance with claim 15, wherein the efficiency policy comprises a phase shedding policy for the phases.

17. An information handling system comprising:

one of more information handling system resources;

a power system electrically coupled to the one or more information handling system resources, the power system comprising:

a plurality of power modules, each power module configured to supply electrical current to the one or more information handling system resources; and a controller electrically coupled to the plurality of power modules and configured to:

selectively enable and disable power modules in accordance with an efficiency policy;

determine if an operating temperature for the power system is greater than a first threshold temperature;

override the efficiency policy to enable one or more power modules disabled in accordance with the efficiency policy in response to a determination that the operating temperature is greater than the first threshold temperature, the one or more power modules enabled to supply electrical current to the one or more information handling system resources;

determine if the operating temperature is lesser than a second threshold temperature; and in response to a determination that the operating temperature is lesser than the second threshold temperature and in accordance with the efficiency policy, disable one or more power modules that were enabled in an override of the efficiency policy and in response to the determination that the operating temperature was greater than the first threshold temperature.

18. An information handling system in accordance with claim 17, the controller further configured to:

determine if the operating temperature is greater than a third threshold temperature; and shut down the power system in response to a determination that the operating temperature is greater than a third threshold temperature.

* * * * *